United States Patent [19]
Beer et al.

[11] Patent Number: 5,124,918
[45] Date of Patent: Jun. 23, 1992

[54] NEURAL-BASED AUTONOMOUS ROBOTIC SYSTEM

[75] Inventors: Randall D. Beer, South Euclid; Hillel J. Chiel, University Heights; Leon S. Sterling, South Euclid, all of Ohio

[73] Assignee: Case Western Reserve University, Cleveland, Ohio

[21] Appl. No.: 467,002

[22] Filed: Jan. 18, 1990

[51] Int. Cl.$^5$ .............................................. G06F 15/50
[52] U.S. Cl. .................... 364/424.02; 901/9; 901/1; 395/21
[58] Field of Search ............ 364/424.01, 424.02, 364/513; 901/1, 9, 46; 395/21, 82, 90, 93

[56] References Cited

U.S. PATENT DOCUMENTS

| | | | |
|---|---|---|---|
| 4,527,650 | 7/1985 | Bartholet | 901/1 |
| 4,641,251 | 2/1987 | Inoue | 364/513 |
| 4,738,583 | 4/1988 | Macconochie et al. | 414/735 |
| 4,884,216 | 11/1989 | Kuperstein | 395/21 |

OTHER PUBLICATIONS

Michael A. McKenna, et al., "Dynamic Simulation of Autonomous Legged Locomotion," Jan. 8, 1989.
Randall D. Beer, et al., "Heterogeneous Neural Networks for Adaptive Behavior in Dynamic Environments," Jan. 20, 1989.
Randall D. Beer, "Intelligence as Adaptive Behavior: An Experiment in Computational Neuroethology," Aug. 1989.
Randall D. Beer, et al., "Periplaneta Computatrix: The Artificial Insect Project," Jan. 20, 1989.
Rodney A. Brooks, "Achieving Artificial Intelligence Through Building Robots," May 1986.
Rodney A. Brooks, "A Robot that Walks; Emergent Behaviors from a Carefully Evolved Network," Neural Computation, pp. 252-262, 1989.
Hillel J. Chiel, et al., "A Lesion Study of Heterogeneous Artificial Neural Network for Hexapod Locomotion," Proceedings of the International Joint Conference on Neural Networks, pp. 407-414, 1989.
Randall D. Beer, et al., "A Biological Perspective on Autonomous Agent Design," Elsevier Science Publishers B. V. (North-Holland), pp. 169-186, 1990.

Primary Examiner—Thomas G. Black
Attorney, Agent, or Firm—Fay, Sharpe, Beall, Fagan, Minnich & McKee

[57] ABSTRACT

A system for achieving ambulatory control of a multilegged system employs stimulus and response-based modeling. A adapted neural network-based system is employed for dictating motion characteristics of a plurality of leg members. Rhythmic movements necessary to accomplish motion are provided by a series of signal generators. A first signal generator functions as a pacemaker governing overall system characteristics. One or more axis control signals are provided to a plurality of leg controllers, which axis control signals work in concert with a system coordination signal from the pacemaker. A sensory mechanism is also employed to govern ambulatory system responses.

14 Claims, 2 Drawing Sheets

NEURAL-BASED AUTONOMOUS ROBOTIC SYSTEM

BACKGROUND OF THE INVENTION

This application pertains to the art of artificial intelligence based systems and more particularly a system in which locomotion control is achieved via adaptations of neural biological concepts.

The invention is particularly applicable to accomplishing motor skill control in an ambulatory insect-like apparatus and will be described with particularly reference thereto. It will be appreciated, however, that the invention has broader applications in modeling performance of high-level human cognitive skills and restricted task domains.

Researchers are becoming increasingly aware that a desirable approach to reacting and controlling within imprecise environments lay with implementation of neural network based systems. These systems provide for an ability to accomplish both supervised and unsupervised learning, and to allow a system to apply learned skills to interact with the imprecise environment.

Fundamental to any progress in actually utilizing artificial intelligence concepts is an ability to model a system in a useful way. A fundamentally sound artificial intelligence ("AI") control system model, in turn, provides a substantial first step to higher-order system modelling.

Although modeling of a simple ambulatory organism presents a first step in a modelling of more complex organisms, such systems provide immediately recognizable real world applications. Autonomous robots are presently under development for use in such diverse applications as military vehicles adapted for rough terrain, as well as unmanned or automated extraterrestrial or underwater exploration.

A comprehensive understanding of such ambulatory insect modeling is found in the following works, authored by the subject inventors and incorporated herein by reference: Periplaneta computatrix: the Artificial Insect Project; Heterogeneous Neural Networks For Adaptive Behavior In Dynamic Environments; A Lesion Study of A Heterogeneous Artificial Neural Network for Hexapod Locomotion; and A Biological Perspective on Autonomous Agent Design.

The present invention contemplates a new and improved system for controlling mobile characteristics of a multi-legged ambulatory unit which provide a readily adaptable autonomous robotic control system. The system is readily realizable by present-day neural networks employing dedicated hardware. Realization is also suitably accomplished by implementation via software in general purpose digital computers. AI languages such as LISP and PROLOG present ideal environments for software realization.

SUMMARY OF THE INVENTION

In accordance with the present invention, there is provided an autonomous robotic locomotion control system. The system includes a pacemaker for generating a system coordination signal defining a selected frequency. A locomotion controller includes a plurality of leg controllers. Each leg controller includes a means for generating a leg controller coordination signal, which signal works in concert with the system coordination signal for controlling one or more axis of movement of a leg element associated therewith.

In accordance with a more limited aspect of the invention, a means is provided for receiving a tactile feedback signal representative of a contact between an autonomous robot under control of the locomotion system.

In accordance with a yet more limited aspect of the present invention, the autonomous robotic locomotion control system is incorporated into a multi-legged autonomous robot.

In accordance with another aspect of the present invention, a method is provided for achieving autonomous robotic locomotion control pursuant to interaction with the afore-going means.

An advantage of the present invention is the provision of neural-based system for autonomous robotic locomotion control Anther advantage of the present invention is the provision of a system which allows for neural-based interaction with an external environment.

Yet another advantage of the present invention is the provision of a system which allows for exemplary modeling of higher level systems with basic artificial intelligence concepts.

Further advantages will become apparent to one of ordinary skill in the art upon a reading and understanding of the following specifications.

BRIEF DESCRIPTION OF DRAWINGS

The invention may take physical form in certain parts, and arrangement of parts, preferred embodiment of which will be described in detail in this specification and illustrated in the accompanying drawings which form a part hereof and wherein:

FIG. 4 illustrates an exemplary tactile sensor used in conjunction with the ambulatory system disclosed wherein.

DETAILED DESCRIPTION OF THE PREFERRED EMBODIMENT

Figure 1:
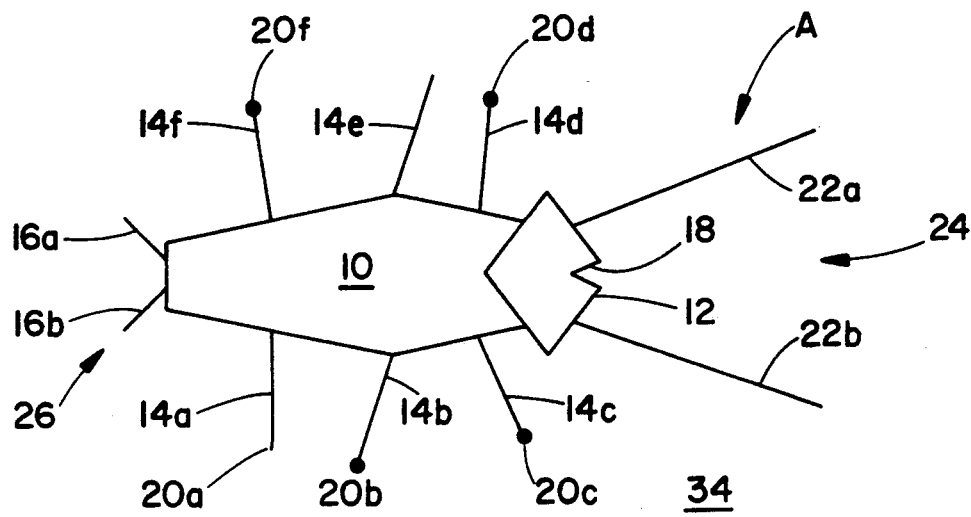
FIG. 1 illustrates a plan view of the ambulatory system modeled and disclosed herein.

Referring now to the drawings wherein the showings are for the purposes of illustrating the preferred embodiment of the invention only, and not for the purposes of limiting the same, FIG. 1 illustrates a representation of a periplaneta computatrix ambulatory model A. The basic structure illustrated in FIG. 1 is utilized to provide a readily-adaptable environment in which the subject control may be utilized. The specific environment is chosen as a reference point only. It will appreciated by one of ordinary skill in the art that other suitable multi-legged embodiments are readily adaptable, as will be appreciated from the description below.

The ambulatory model A is provided with an abdomen 10, a head 12, six legs 14a-14f, and cerci 16a and 16b. Disposed in the head 12 is a mouth region 18 which suitably includes tactile and chemical sensors, and is provided with an ability to open or close. The cerci 16 are suitably provided with tactile and wind or fluid sensors.

Each leg 14a–14f includes a foot portion 20a–20f, respectively, which foot portions are either in an up or down position. The foot is illustrated as a square when in the down position, as is presented in feet 20b, 20c, 20d, and 20f. The ambulatory model is also suitably comprised of antennae 22a and 22b, which antennae include tactile and chemical sensors.

In the illustrated embodiment, tactile and chemical sensation is provided in a frontal region 24 of the model A via mouth region 18 and antennae 22. An analogous sensation at a lateral region 26 is provided by cerci 16.

Although the model A is illustrated two-dimensionally, it will be appreciated that it, in fact, illustrates a three-dimensional object which is capable of becoming astable. Such instability will result when a center of mass of the model A falls for an extended period of time outside of a polygon formed by the feet 20.

Locomotion of the model A is accomplished by selective manipulation of legs 14 and feet 20. Typically, the model will progress in a direction of propagation generally along a longitudinal axis defined through abdomen 10 and head 12. However, it will be appreciated that with appropriate leg manipulation and foot positioning, a full two-dimensional degree of freedom is afforded along a plane 34 upon which the model sits.

In straight-line locomotion, the legs 14 apply forces which translate the body, which body includes all portions of the model A. Turning is suitably accomplished by directing the front legs, 14c and 14d in the illustrated embodiment, to apply forces which rotate the body. When a corresponding foot, 20c and 20d respectively, is down, a front leg can cause a turn away from its side of the body by applying a lateral force.

Figure 2:
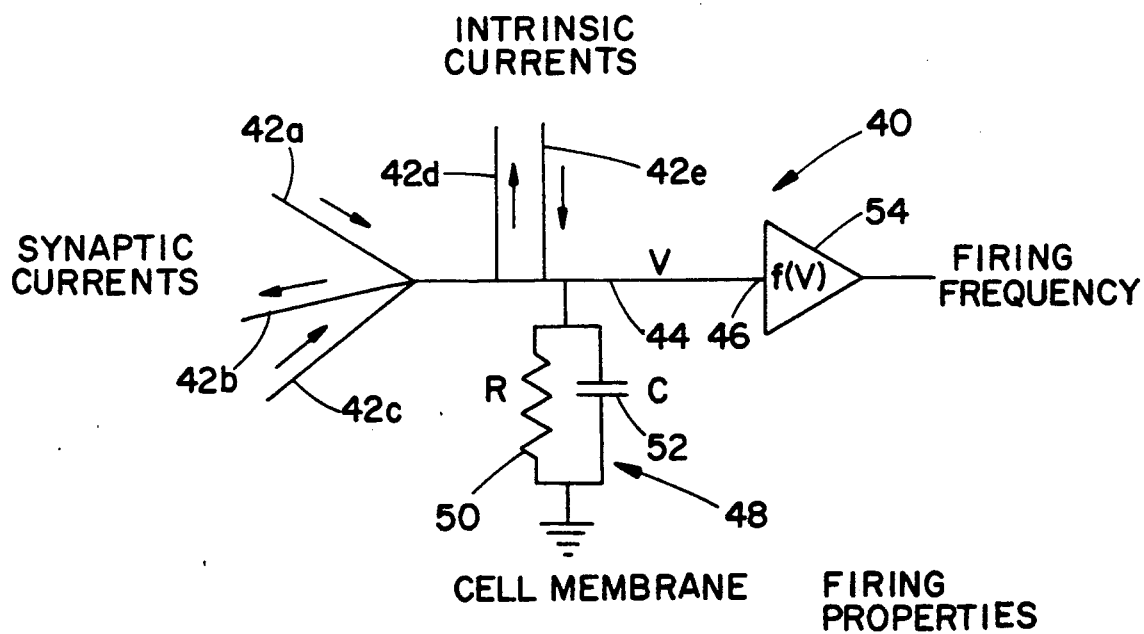
FIG. 2 illustrate a circuit diagram of the neural model used to accomplish basic motion control of the ambulatory model disclosed herein.

In the subject application, rhythmic oscillations of all appendages necessary to achieve locomotion is accomplished by control of a plurality of motor neurons. FIG. 2 illustrates an exemplary neural circuit 40 for achieving electrical realization of a control neuron or pacemaker neuron. The illustrated neuron 40 has a plurality of synapse connectors 42, illustrated as 42a–42e in the neuron 40. In the subject neural system, all synapses information is relayed in electrical signals. In the preferred embodiment, the electrical signals are formed by a direct current, the magnitude of which is proportional to an oscillatory period represented thereby. All signals from the synapse connectors 42 are communicated to a common primarily conductor 44. Although direct indication is indicated, it will be appreciated that a summing is, in fact, accomplished as to all influences the individual connectors 42.

In addition to currents induced by synapse connectors 42, an influence on a voltage along conductor 44 is presented by a resistance/capacitance ("R/C") network 48. This network is modelled with a conventional parallel connection of a resistor 50 and a capacitor 52. The R/C network 48 presents an influence on electrical properties along the primary conductor 44 which is analogized to that influence dictated by a cell membrane in a typical biological neuron analogous to that 40.

A conductor 44 forms an input to an amplifier 54 which outputs a voltage proportional to the direct current voltage at its inputs 42d, 42e. It will be appreciated, therefore, that an alternating current frequency at an output 52 of amplifier 50 is dictated by a combined influence from all synapse connectors 42 in conjunction with R/C network 48.

With renewed reference to FIG. 1, implementation of neural control of the ambulatory model A will be described. Overall system coordination is accomplished by implementation of a neuron 40 functioning as a pacemaker. This pacemaker provides an system coordination signal which defines a selected frequency. The amplifier 50 of FIG. 2 is suitably adapted to this role by tying the input to amplifier 50 to a selected voltage level to achieve a selected frequency. It will be appreciated, also, that the frequency of the system pacemaker is suitably controlled by varying the input voltage to the amplifier accordingly.

The common neuron sets the fundamental frequency for of the pacemakers controlling movement of the model. Ideally, default oscillation levels which will allow for a straightforward progression of the model are accomplished solely by use of pacemaker outputs. The other variations, such as turning, are accomplished by use of additional neurons on one or more of the legs. Variation in neural excitation to various of the secondary or turning neurons allows for path control. Use of a random element facilitates wandering or exploration by the model.

Figure 3:
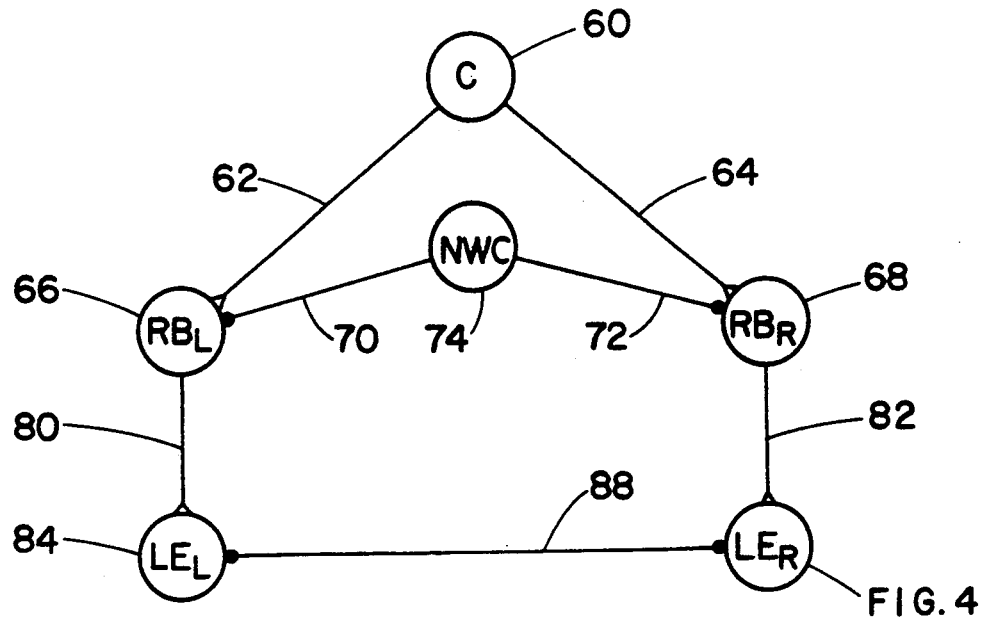
FIG. 3 illustrates a neural network of a wandering controller utilizes by the ambulatory model disclosed herein.

Turning now to FIG. 3, implementation of neural control governing wandering or exploration features in each leg of the model A is illustrated by interconnections of several neurons. Command neuron in the illustration governs overall system response. Command neuron 60 is interconnected via an excitatory connections 62 and 64 to random burst neuron $RB_L$ 66 and random burst neuron $RB_R$ 68, respectively. These neurons are, in turn, connected via inhibitory connections 70 and 72, respectively, to a nonwandering control neuron 74.

Both random burst neurons 66 and 68 are also connected, via excitatory connections 80 and 82, respectively, to lateral extensor $LE_L$ 84 and lateral extensor $LE_R$ 86, respectively. The lateral extensors 84 and 86 are, in turn, interconnected via inhibitory connection 88. With the above-described interconnections, a neural system for accomplishing periodic turns is disclosed. The random burst neuron 66 and 68 function to alternate a signal generated therefrom between high and low potentials. Unlike the signal generated by the command neuron 60, currents generated by the random burst neurons vary randomly. Suppression of wandering is dictated by an output of the non-wandering control neuron 74.

In operation, during a wandering sequences, one of the random burst neurons 66 and 68 will begin to burst, exciting the corresponding leg extensor 84 or 86. Interconnections between the extensors 84 and 86 ensures that only one of them will be active at a given time. Ideally, threshold voltage levels of the random bursters are set such that their intrinsic currents alone are incapable of making them burst. An external excitation, provided by the command neuron 60, provides this additional forcing function. This arrangement advantageously provides that the random burster will only be active when the command neural 60 is enabled. In this fashion, the controller only generates returns when the model is actually walking. Additionally, the non-wandering controller 74 is provided to allow for an override of the excitation supplied by the command neuron 60, effectively shutting off wandering. This allows other circuits to take control of turning, when necessary.

Figure 4:
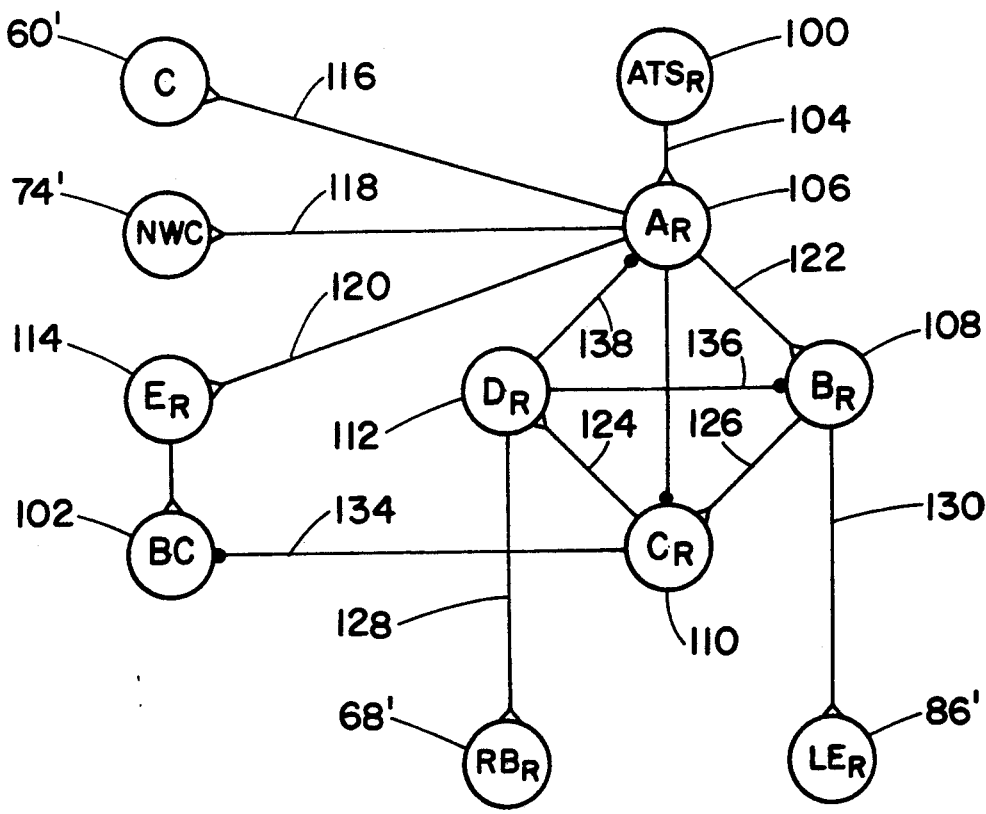

Turning now to FIG. 4, an additional neural structure which facilitates sensory, such as recoil, responses will be described. Certain components of the diagram of FIG. 4 are analogous to those described in conjunction with FIG. 3. For ease in description, corresponding, primed numbers have been used for them. Included are the command neuron 60′, the random burst neuron RBR 68′, the non-wandering controller 74′, and the lateral extensor LE$_R$ 86′. The embodiment of FIG. 4 is presented in terms of a response controller directed particularly to right antennae recoil system. It will be appreciated, however, that analogous structure is suitably provided for any sensory organ pertinent to the system. The same controller can, in point of fact, be readily adapted for both forward and backward walking by including all connections necessary for both.

The additional structure of FIG. 4 includes a backward command neuron 102 which functions to turn on, off or to invert connections as necessary to reverse the direction of walking. This accomplished by modulatory synapses on connections forming the combined controller.

In operation, antenna tactile sensor 100 generates a burst upon contact with an exterior object, the burst frequency being proportional to relative orientation of the body and a tangent line of the object at a point of contact. In a suitable application, a larger angle dictates a higher firing frequency. In this fashion, ahead-on collision would provide a highest frequency burst and glancing contact the lowest. This burst excites, through excitatory connection 104, trigger cell neuron AR 106. Trigger cell neuron 106 suitably translates a brief burst of activity into an extended response, the characteristics of which are dependent upon the initial burst.

Accordingly, whenever external currents cause such a burst, an intrinsic current is triggered, the magnitude and duration of which is proportional to a membrane potential of the particular neuron or cell. This, in turn, governs duration of an entire recoil process. The remaining neurons BR 108, CR 110, and DR 112 function, analogously to trigger neural 106, to control durations of various phases of a recoil response. Typically, the remaining neurons 108, 110, and 112 have large time constants (on the order of tens to hundreds of milliseconds), and comparatively high thresholds.

Interconnections between the various neurons of the diagrams of FIG. 4 is accomplished with excitatory connections 118, 120, 122, 124, 126, 128 and 130 interconnected as shown. Also utilized are inhibitory connectors 134, 136 and 138, also connected as illustrated.

Operation of the controller of FIG. 4 is as follows. When the exemplary right antenna contacts an object, antenna tactile sensor 100 generates a brief burst, the frequency of which is proportional to the contact angle. The brief burst produces an extended burst and the triggered neuron 106, whose frequency and duration are proportional to the activity of tactile sensor 100. Activity in neuron 106 has a number of reactions. Initially, it excites the locomotion command neuron 60′. In the event that the model is immobile when the contact occurs, walking or locomotion is commenced. In the event the model was in motion, then it will proceed to walk at a faster rate. Next, the wandering controller is disabled for the duration of the recoil response by exciting NWC 74′. Next, neuron 106 causes excitation of extensor 114. In the event that the extensor 114 achieves a preselected threshold level, the model is caused to walk backwards by excitation of the backward command neuron 102. Accordingly, extensor 114 implements the decision whether or not to back up, based upon the contact angle.

In addition to the foregoing, neuron 106 causes an excitation of neuron 108. After an initial delay, due to a preselected slightly larger time constraint, neuron 108 will begin to burst and to cause a turn to the left by excitation of right lateral extensor 86′. After a somewhat longer delay, neuron 108 will cause neuron 110 to burst, effectively shutting off the backward control 102, if it is active, thereby allowing the model to begin walking forward. The time is takes neuron 110 to transcend this threshold is also modulated by the inhibitory connection from neuron 106. Accordingly, the more head-on a collision is, the more backing up the model will do.

Neuron 110 also excites neuron 112 with the subject construction. After another delay, during which the model is walking forward and still turning away from the contact object, neuron 112 will burst inhibiting neurons 106 and 108, thus terminating the recoil response. Neuron 112 also excites right random burster 68′, causing the wandering controller to continue to move the insect away from the direction of the contacted object, even after a recoil response is complete. For glancing contacts, trigger current in neuron 106 may suitable terminate before the 106, 108, 110 and 112 loop is completed. In this instance, only a short turn away from the direction of contact is generated.

This invention has been described with reference to the preferred embodiment. Obviously, modifications and alterations will occur to others upon the reading and understanding of this specification. It is intended that all such modifications and alternations be included insofar as they come within the scope of the appended claims, or the equivalence thereof.

Having thus described the invention, it is now claimed:

1. An autonomous robotic locomotion control system comprising:
 means for generating a steady system response signal which sets a selected frequency of the coordination means;
 a locomotion controller including a plurality of leg controllers in mutual data communication, each leg controller including,
  means for receiving the system response signal which sets frequency of the coordination means;
  coordination signal generating means for generating a leg controller coordination signal defining a selected frequency,
  first movement coordination means for generating a first axis control signal representative of a desired displacement of an associated leg in a first degree of freedom, in accordance with the system response signal and the leg controller coordination signal, and
  second movement coordination means for generating a second axis control signal representative of a desired displacement of the associated leg in a second degree of freedom, in accordance with the system response signal and the leg controller coordination signal, and
  communication means adapted for communicating the first and second axis control signals to a leg element associated therewith;
 means for influencing at least one of the first and second axis control signals in accordance with data received from at least one other leg controller of the plurality; and means for selectively altering the selected frequency defined by at least one coordination signal generating means whereby the selected frequency is suitably adapted for alteration by signals representative of at least a position of an associated leg.

2. The autonomous robotic locomotion system of claim 1 wherein:
at least one of the plurality of leg controllers includes third movement coordination means for selectively generating a third axis control signal representative of a desired displacement of the associated leg in a third degree of freedom, in accordance with the system response signal and the leg controller coordination signal; and
the communication means of the at least one of the plurality of leg controllers includes means adapted for communicating the third axis signal to the leg element associated therewith.

3. The autonomous robotic locomotion control system of claim 1 further comprising:
means for receiving a tactile feedback signal representative of a contact between an autonomous robot under control of the locomotion control system and its associated environment; and
means for selectively altering a frequency of the system response signal in accordance with the tactile feedback signal.

4. An autonomous robotic locomotion control system comprising:
means for generating a system coordination signal defining a selected frequency;
a locomotion controller including a plurality of leg controllers, each leg controller including,
means for receiving the system coordination signal from the means for generating a system coordination signal;
coordination signal generating means for generating a leg controller coordination signal defining a selected frequency, wherein at least one of the coordination signals are defined by variable direct current levels,
first movement coordination means for generating a first axis control signal representative of a desired displacement of an associated leg in a first dimension, in accordance with the system coordination signal and the leg controller coordination signal, and
second movement coordination means for generating a second axis control signal representative of a desired displacement of the associated leg in a second dimension, in accordance with the system coordination signal and the leg controller coordination signal, and
communication means adapted for communication the first and second axis control signals to a leg element associated therewith;
means for selectively altering the selected frequency defined by at least one coordination signal generating means;
means for receiving a tactile feedback signal representative of a contact between an autonomous robot under control of the locomotion control system and its associated environment; and
means for selectively altering a frequency of the system coordination signal in accordance with the tactile feedback signal;
within each locomotion controller at least one movement coordination means including,
first summing means for generating a sum signal representative of a summation of the system coordination response signal level and the leg controller coordination signal, and
means for generating the first axis coordination signal as a periodic control signal, a frequency of which is dictated by the sum signal.

5. The autonomous robotic locomotion control system of claim 4 further means for randomly varying a magnitude of at least one leg controller coordination signal.

6. The autonomous robotic locomotion control system of claim 4 including further means for randomly varying a magnitude of at least one leg controller coordination signal.

7. An autonomous robot comprising:
coordination means for generating a system response signal formed as a direct current, a magnitude of which defines a selected frequency;
a locomotion unit including a plurality of leg units in mutual data communication, each leg unit including,
means for receiving the system response signal from the coordination means;
coordination signal generating means for generating a leg controller coordination signal formed as a direct current, a magnitude of which defines a selected frequency,
first movement coordination means for generating a first axis control signal representative of a desired displacement of an associated leg in a first degree of freedom, in accordance with the system response signal and the leg controller coordination signal, and
second movement coordination means for generating a second axis control signal representative of a desired displacement of the associated leg in a second degree of freedom, in accordance with the system response signal and the leg controller coordination signal,
communication means for communicating the first and second axis control signals to a leg driver element associated therewith, and
the associated leg driver including means for periodically driving a leg unit in accordance with the first and second axis control signals and data received from at least one other leg unit of the plurality;
means for receiving a tactile feedback signal representative of a contact between the autonomous robot and its environment; and
means for selectively altering a frequency of the system response signal in accordance with the tactile feedback signal.

8. The autonomous robot of claim 7 wherein at least one of the plurality of locomotion units further comprises third movement coordination means for selectively generating a third axis control signal representative of a desired displacement of the associated leg in a third degree of freedom in accordance with the system response signal and the leg controller coordination signal, and wherein the at least one of the plurality of leg units has:
the communication means including means adapted for communicating the third axis signal to the leg driver associated therewith; and the associated leg driver including means for periodically driving the leg unit in accordance with the third axis signal.

9. The autonomous robot of claim 8 wherein each locomotion unit includes, first summing means for generating a sum signal representative of a summation of the system response signal level and the leg controller coordination signal; and means for generating the first axis coordination signal as a periodic control signal, a frequency of which is dictated by the sum signal.

10. The autonomous robot of claim 9 further means for randomly varying a magnitude of at least one leg controller coordination signal, whereby movement of a leg driver associated therewith is altered.

11. A method of autonomous robotic locomotion control comprising the steps of:

generating a system response signal defining a selected frequency;

communicating the system response signal from the coordination means to a summing circuit;

generating a leg controller coordination signal defining a selected frequency;

communicating the leg controller signal to the summing circuit;

generating, in the summing circuit, a first axis control signal representative of a desired displacement of an associated leg in a first degree of freedom, in accordance with the system response signal and the leg controller coordination signal;

generating a second axis control signal representative of a desired displacement of the associated leg in a second degree of freedom, in accordance with the system response signal and the leg controller coordination signal;

communicating the first and second axis control signals to a leg element associated therewith; and selectively altering the selected frequency defined by at least one coordination signal generating means.

12. The method of claim 11 further comprising the steps of:

selectively generating a third axis control signal representative of a desired displacement of the associated leg in a third degree of freedom, in accordance with the system response signal and the leg controller coordination signal; and communicating the third axis signal to the leg element associated therewith.

13. The method of claim 12 further comprising the steps of:

receiving the tactile feedback signal representative of a contact between an autonomous robot under control of the locomotion control system and its environment; and selectively altering a frequency of the system response signal in accordance with the tactile feedback signal.

14. The autonomous robotic locomotion control system of claim 3 wherein at least the coordination signals are defined by variable direct current levels, and within each locomotion controller at least one movement coordination means includes, first summing means for generating a sum signal representative of a summation of the system response signal level and the leg controller coordination signal; and means for generating the first axis coordination signal as a periodic control signal, a frequency of which is dictated by the sum signal.

* * * * *